June 22, 1965 E. O. CAIN 3,191,112
MOTOR CONTROL SYSTEM UTILIZING SEMICONDUCTOR
CONTROLLED RECTIFIERS
Filed Dec. 26, 1961 2 Sheets-Sheet 1

Ernest O. Cain
INVENTOR.

BY John G. Graham

Ernest O. Cain
INVENTOR.

United States Patent Office 3,191,112
Patented June 22, 1965

3,191,112
MOTOR CONTROL SYSTEM UTILIZING SEMI-
CONDUCTOR CONTROLLED RECTIFIERS
Ernest O. Cain, Dallas, Tex., assignor to Texas Instruments Incorporated, Dallas, Tex., a corporation of Delaware
Filed Dec. 26, 1961, Ser. No. 162,156
7 Claims. (Cl. 318—246)

This invention relates to a control system for supplying direct current to a load from an A.C. source by utilizing semiconductor controlled rectifiers. More particularly, this invention relates to a control circuit using semiconductor controlled rectifiers and adapted to supply current to a variable-speed D.C. series motor.

Series motors of the type commonly used in small home appliances and hand tools have a speed-torque characteristic which is generally referred to as hyperbolic. As a motor of this type is loaded, the speed decreases sharply, but the motor has the advantageous feature of providing very high starting torque or high torque at low speeds. In appliance and hand tool applications, it would be preferable to retain the high torque characteristics at low speeds, but to provide control or selection of the no-load speed without degrading the low-speed, high-torque aspects. This type of motor is ordinarily available commercially in a form wherein the field winding is split into two parts with the armature connected in between. In this form, the armature voltage or back E.M.F. is not available at the motor terminals and so it cannot be used alone as a control factor. That is, the voltage at the motor terminals will include the voltage across the series field windings as well as the armature voltage.

It is therefore the principal object of this invention to provide a control circuit for a two-terminal series motor which will make available a plurality of no-load speed settings but will not degrade the starting torque or high torque characteristics of the series motor. An additional object is to provide an improved triggering circuit for a semiconductor controlled rectifier when used in a series motor supply system. Another object is to provide a D.C. series motor control system utilizing controlled rectifiers and requiring a minimum of components.

In accordance with this invention a load, such as a series motor, is connected across a pulsating unidirectional current source through a controlled rectifier. A capacitor and a resistor shunt the load so that the cathode of the controlled rectifier will be maintained at some varying D.C. level. A trigger circuit is provided for firing the controlled rectifier and includes an RC circuit connected between the anode and cathode of the controlled rectifier. The output of the RC circuit is connected to the gate of the controlled rectifier by a threshold trigger device. By varying one of the elements of the RC circuit, the firing angle of the controlled rectifier and the no-load speed of the motor may be controlled, feedback being provided due to the fact that the cathode voltage is determined by the motor speed. The trigger circuit includes a provision for insuring that the controlled rectifier fires late in each half-cycle regardless of the load voltage.

The novel features believed characteristic of the invention are set forth in the appended claims. The invention itself, however, along with further objects and advantages thereof, may best be understood by reference to the following detailed description of a particular embodiment, when read in conjunction with the accompanying drawing, wherein:

Figure 1:
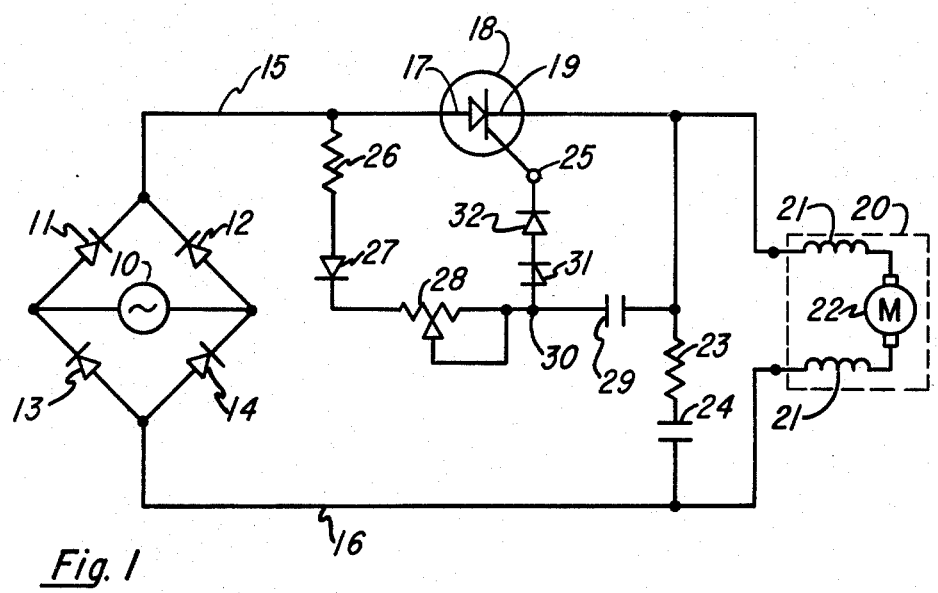
FIGURE 1 is a schematic diagram of a control circuit utilizing the principal features of this invention.

With reference to FIGURE 1, the control system of one embodiment of this invention is shown to include an alternating current source 10, which may be the usual 110 volt 60 cycle power line, connected across opposite terminals of a diode bridge. The bridge includes diodes 11–14 arranged for full-wave rectification, the remaining terminals of the bridge being connected across a pair of lines 15 and 16. The line 15 is connected to an anode 17 of a controlled rectifier 18, while the cathode 19 of the controlled rectifier is connected to one terminal of a load 20. This load 20 could be a series D.C. motor which would ordinarily include a field winding 21 which is split into two parts, one being on each side of the armature 22. The line 16 is directly connected to the other terminal of the load 20. With this arrangement, unidirectional current will be supplied to the load 20 in a full-wave rectified type waveform, the amount of current flowing in any half cycle depending upon the firing angle of the controlled rectifier 18.

In order to determine the firing angle of the controlled rectifier 18, and to provide various speed settings for the motor, a biasing and trigger arrangement is utilized. A small resistor 23 and a large capacitor 24 are connected in a series across the load so that the voltage on the cathode 19 will be smoothed out to some extent and the voltage spikes due to commutation of the motor will be removed. At relatively low motor speeds, the capacitor 24 will discharge fairly rapidly between current pulses or during each half cycle when the controlled rectifier 18 is not conducting. When the motor speed is high, the back E.M.F. will prevent the capacitor 24 from discharging as rapidly. The series resistance of the motor is very small, only a few ohms, so the back E.M.F. will be the primary determining factor in the rate at which the capacitor 24 discharges. No back E.M.F. can exist without field current, so the current provided by discharge of the capacitor insures that a D.C. voltage will be maintained on the cathode of the controlled rectifier in the intervals between conductive periods thereof.

With the cathode voltage being related to load impedance and motor speed, the firing angle of the controlled rectifier 18 will be likewise related to these factors. The controlled rectifier will fire during each half cycle only if the voltage on the anode 17 and the voltage on the gate 25 exceed the cathode voltage by specified amounts as determined by the characteristics of the device. Triggering pulses are provided to the gate 25 by a series circuit which is connected from the anode 17 to the cathode 19 and which includes a fixed resistor 26, a diode 27, a variable resistor 28, and a capacitor 29. This series circuit provides a voltage at a junction 30 which lags the anode-cathode voltage by an amount determined by the total value of the resistors 26 and 28 along with the magnitude of the capacitor 29. This junction 30 is connected to the gate 25 through a threshold device such as a four-layer diode 31 and a conventional diode 32, connected in series. The diode 31 is adapted to be substantially nonconductive until the voltage across this device reaches a certain level and then to conduct heavily or have little impedance for higher voltages.

Figure 2:
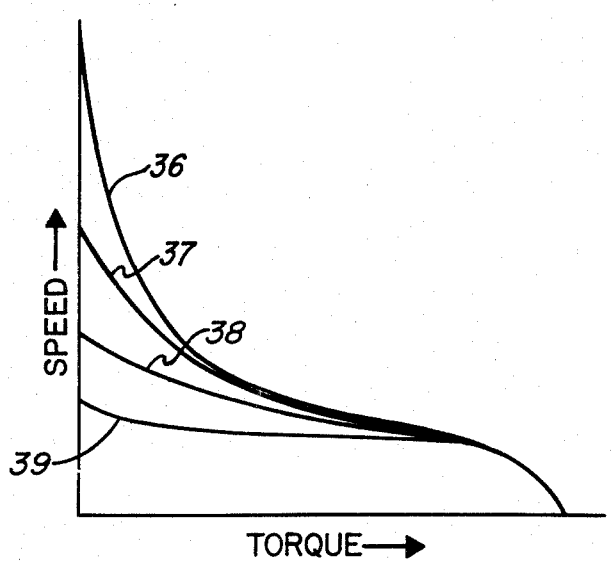
FIGURE 2 is a graph of motor speed versus torque for various speed settings of the control system of FIGURE 1.

If the load 20 is a motor, the speed vs. torque curve of the motor will change for various settings of the variable resistor 28 as seen in FIGURE 2. When the tap on the resistor 28 is moved to the far left, or highest speed setting, the motor exhibits approximately its standard hyperbolic speed-torque characteristic as seen by a curve 36, this being about the same as it would with no control at all. In this condition, the controlled rectifier begins to conduct at the beginning of each half cycle, or as soon as the voltage on the junction 30 is high enough to break down the diode 31. In the lower speed positions, or as the tap on the resistor 28 is moved to the right, the motor runs at lower speeds for low torque as seen by the curves 37, 38 and 39. In these conditions, the controlled rectifier conducts less than 180° during each half cycle since the junction 30 reaches the triggering level after a lag determined by the magnitude of the resistor 28. As the motor is loaded, however, the firing angle advances so that the curves 37, 38 and 39 join the curve 36, furnishing full torque capacity. That is, in all of the speed settings the conduction angle will reach nearly 180° before the motor is loaded to maximum torque.

Figure 3:
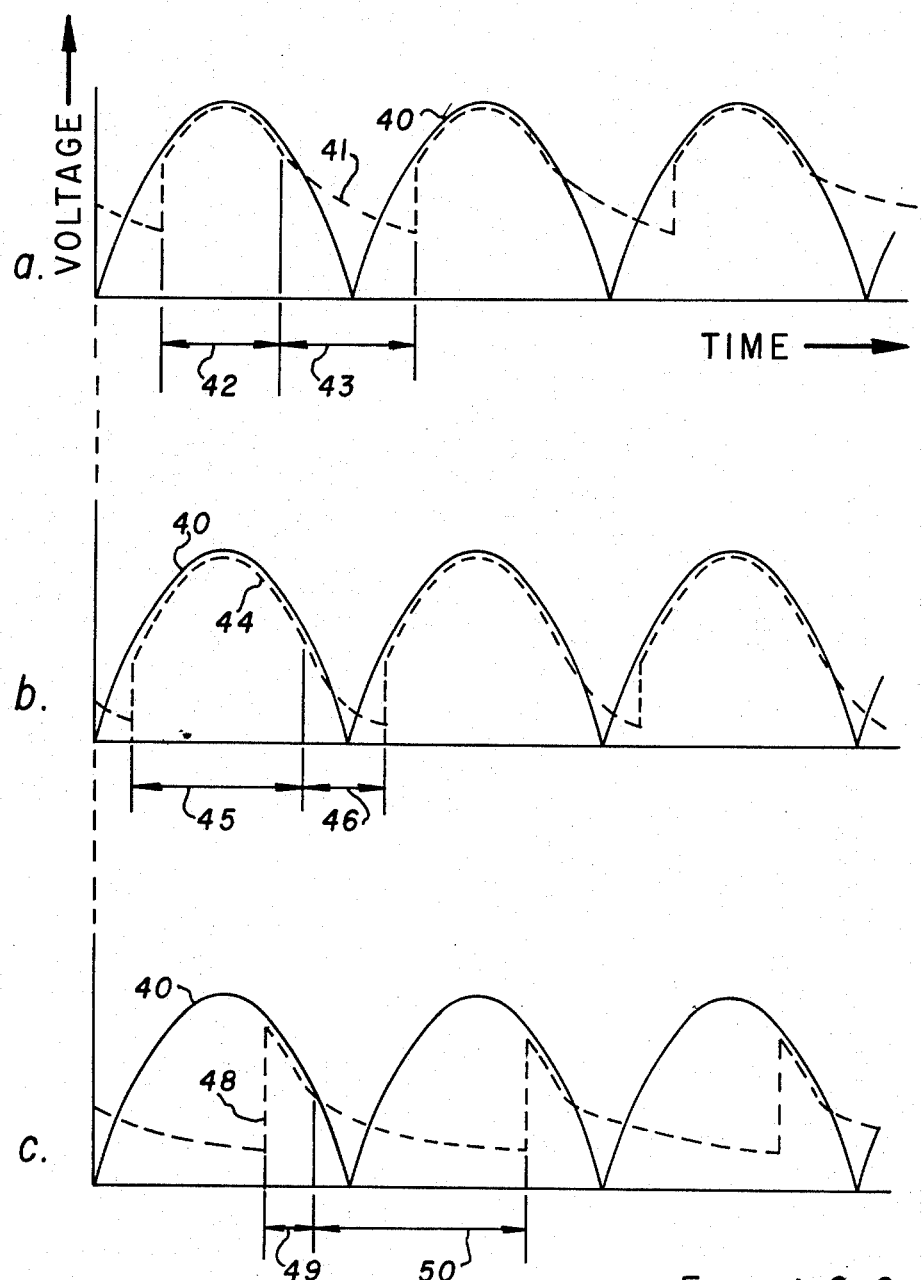
FIGURES 3a–3c illustrate voltage waveforms appearing at various points in the circuit of FIGURE 1.

The operation of this invention may best be understood by reference to FIGURES 3a–3c wherein waveforms of voltages appearing on the controlled rectifier are shown. The voltage between the lines 15 and 16 is a full-wave-rectified sine wave 40. The voltage across the load 20, or the voltage between the cathode 19 and the line 16, will appear as seen by a dashed line 41 of FIGURE 3a. When the controlled rectifier 18 is conducting, which is during an interval 42, the cathode voltage will be substantially equal to the anode voltage since the drop across the device is quite small. When the anode voltage falls below the voltage which will have been built up on the cathode due to the capacitor 24, the controlled rectifier will cut off and the capacitor 24 will discharge through the load. This discharge will occur during an interval 43 as seen in FIGURE 3a, and the rate of discharge will be dependent upon the motor impedance and back E.M.F. For lower motor speeds at this same speed setting, the capacitor 24 would discharge faster, resulting in a cathode voltage waveform 44 as seen in FIGURE 3b, for example. Here the conduction interval 45 would be longer, tending to speed up the motor, and the capacitor discharge interval 46 would be shorter and steeper. The controlled rectifier would be fired earlier in each half cycle, relative to the FIGURE 3a situation, due to two conditions. First, the anode voltage would exceed the cathode voltage earlier in the half cycle since the cathode voltage would be lower. Secondly, the voltage on the junction 30 would reach the triggering level sooner since the cathode voltage is lower. Also, the controlled rectifier would conduct later during each half cycle in the FIGURE 3b situation, compared to that of FIGURE 3a, since the capacitor 24 would have less tendency to back bias the anode-cathode.

With the lowest speed setting, or when the tap on the potentiometer 28 is moved to the far right, the voltage waveforms on the controlled rectifier 18 might appear as in FIGURE 3c for no-load conditions. The cathode voltage, represented by a dashed line 48, indicates that the controlled rectifier fires late in each half cycle, this being due to the fact that the larger resistance in the series RC circuit prevents the junction 30 from reaching the firing level until later. The controlled rectifier will thus conduct for a short interval 49 during each half cycle and will then be nonconductive for a much longer interval 50 during which time the capacitor 24 discharges. The values of the resistors 26 and 28 and the capacitor 29 are selected so that the controlled rectifier will fire during each half cycle even though there is no load on the motor. This prevents the motor from surging or lopping.

While the values of the circuit components used in any particular embodiment of the invention would depend on the various requirements thereof, the following specifications are given by way of example only.

| | | |
|---|---|---|
| Resistor 23 | ohms | 3 |
| Resistor 26 | kilohms | 4.7 |
| Resistor 28 | do | 100 |
| Capacitor 24 | μfd | 20 |
| Capacitor 29 | do | 0.33 |

Although the invention has been described with reference to an illustrative embodiment, this description is not meant to be construed in a limiting sense. It is, of course, understood that various modifications may be made by persons skilled in the art, and so it is contemplated that the appended claims will cover any such modifications as fall within the true scope of the invention.

What is claimed is:
1. A control circuit comprising:
 (a) a source of unidirectional pulsating voltage having positive and negative output terminals,
 (b) a load having first and second terminals and exhibiting varying voltage drop thereacross, said second terminal being connected to said negative output terminal,
 (c) a semiconductor controlled rectifier having an anode, a cathode and a gate, said anode being connected to said positive output terminal, said cathode being connected to the first terminal of said load,
 (d) a first capacitor and a first resistor connected in series across the first and second terminals of said load,
 (e) a variable resistor and a second capacitor connected in series between said anode and said cathode,
 (f) and a unidirectional conductive threshold trigger device connected between said gate and the juncture of said variable resistor and said second capacitor.
2. Apparatus according to claim 1 wherein the magnitude of said first resistor is greater than the resistance of said load.
3. Apparatus according to claim 1 wherein the values of said variable resistor and said second capacitor are such that the breakdown voltage of said trigger device is exceeded during each period of said source.
4. A motor control circuit comprising:
 (a) a source of unidirectional pulsating periodic voltage having positive and negative output terminals,
 (b) a series motor having first and second terminals and exhibiting a varying voltage drop thereacross, said second terminal being connected to said negative output terminal,
 (c) a semiconductor controlled rectifier having an anode, a cathode and a gate, said anode being connected to said positive output terminal, said cathode being connected to said first terminal,
 (d) a first capacitor and a first resistor connected in series across the first and second terminals of said motor,
 (e) a variable resistor and a second capacitor connected in series in the named order between the anode and cathode of said controlled rectifier,
 (f) and unidirectionally conductive threshold trigger means connected between said gate and the juncture of said variable resistor and said second capacitor whereby firing voltage is applied to said gate during each period of said source at a time dependent upon the value of said variable resistor and the speed of said motor.
5. A motor control system comprising:
 (a) an alternating current source,
 (b) a full wave rectifier having an input connected to said alternating current source and having positive and negative output terminals,
 (c) a motor having first and second input terminals, the armature and field windings of said motor being connected in series between said first and second input terminals, said second input terminal being connected to the negative output terminal of said rectifier,
 (d) a semiconductor controlled rectifier having an anode, a cathode and a gate, said anode being connected to the positive output terminal of said rectifier, said cathode being connected to the first input terminal of said motor,

(e) a first capacitor and a first resistor connected in series across the first and second input terminals of said motor,
(f) a variable resistor and a second capacitor connected in series in the named order between said anode and said cathode,
(g) and a unidirectional conductive threshold trigger device connected between said gate and the juncture of said variable resistor and said second capacitor.

6. A motor control system comprising:
(a) an alternating current source,
(b) a full wave diode bridge rectifier having an input connected to said alternating current source and having positive and negative output terminals,
(c) a series motor having first and second input terminals, the armature and field windings of said motor being connected in series between said first and second input terminals, said second input terminal being directly connected to the negative output terminal of said rectifier,
(d) a semiconductor controlled rectifier having an anode, a cathode and a gate, said anode being connected to the positive output terminals of said rectifier, said cathode being connected to the first input terminal of said motor,
(e) a first capacitor and a first resistor connected in series across the first and second input terminals of said motor to provide motor current during nonconductive intervals of said controlled rectifier and to provide feedback to the cathode of said controlled rectifier which is related to motor speed,
(f) a variable resistor and a second capacitor connected in series in the named order between the anode and cathode of said controlled rectifier, said variable resistor providing a plurality of no-load speed settings for said motor,
(g) and a unidirectional conductive threshold trigger device connected between said gate and the juncture of said variable resistor and said second capacitor, the values of said variable resistor and said second capacitor being such that the breakdown voltage of said trigger device is exceeded and said controlled rectifier is thereby fired during each half cycle of said alternating current source.

7. Apparatus according to claim 6 wherein the magnitude of said first resistor is substantial relative to the impedance of said motor.

References Cited by the Examiner
UNITED STATES PATENTS 2,552,206   5/51   Moyer _____ 318—246
2,981,880   4/61   Momberg et al. _____ 318—345 X

OTHER REFERENCES

Publication: Application and Circuit Design Notes, Bulletin D420-02-12-59, Solid State Products, Inc., page 14.

ORIS L. RADER, *Primary Examiner.*

MILTON O. HIRSHFIELD, *Examiner.*